United States Patent [19]

Lamort

[11] 4,154,407
[45] May 15, 1979

[54] REDUCING DRUM FOR THE EXTRACTION OF CELLULOSIC MATTERS

[75] Inventor: Pierre Lamort, Vitry-le-Francois, France

[73] Assignee: Etablissements E. & M. Lamort, Vitry-le-Francois, France

[21] Appl. No.: 813,955

[22] Filed: Jul. 8, 1977

[30] Foreign Application Priority Data

Jul. 9, 1976 [FR] France ............................. 76 21035

[51] Int. Cl.² ............................................. B02C 23/18
[52] U.S. Cl. ....................................... 241/38; 241/74; 241/79; 241/87; 241/187; 241/228; 241/DIG. 38
[58] Field of Search ................... 241/38, 41, 42, 45, 241/52, 53, 73, 74, 79, 79.1, 79.3, 80, 85, 87, 167, DIG. 38, 187, 228

[56] References Cited

U.S. PATENT DOCUMENTS

| | | | |
|---|---|---|---|
| 1,491,841 | 4/1924 | Bell | 241/79 |
| 1,837,782 | 12/1931 | Little | 241/85 |
| 2,138,715 | 11/1938 | Thorsen | 241/38 |
| 2,729,858 | 1/1956 | Horton et al. | 241/41 |
| 3,149,065 | 9/1964 | Van Doorn | 241/73 |
| 3,658,263 | 4/1972 | Zeisler et al. | 241/167 |
| 3,931,937 | 1/1976 | Hahn et al. | 241/74 |
| 3,973,735 | 8/1976 | Ito et al. | 241/73 |
| 3,993,252 | 11/1976 | Ito et al. | 241/DIG. 38 |

*Primary Examiner*—Richard B. Lazarus
*Attorney, Agent, or Firm*—Darby & Darby

[57] ABSTRACT

A device for extracting cellulosic and similar materials such as rags, plastics, light metals and wood, which includes a drum which is driven in a first direction at a first speed and a rotor inside of the drum which is driven in a direction opposite to the first direction at a speed higher than the first speed. A plurality of teeth are located on the periphery of the drum along a part of its length for shredding the material placed into the drum input. A fixed plate and a plate of adjustable height are placed at the output of the drum against which the other materials accumulate.

19 Claims, 6 Drawing Figures

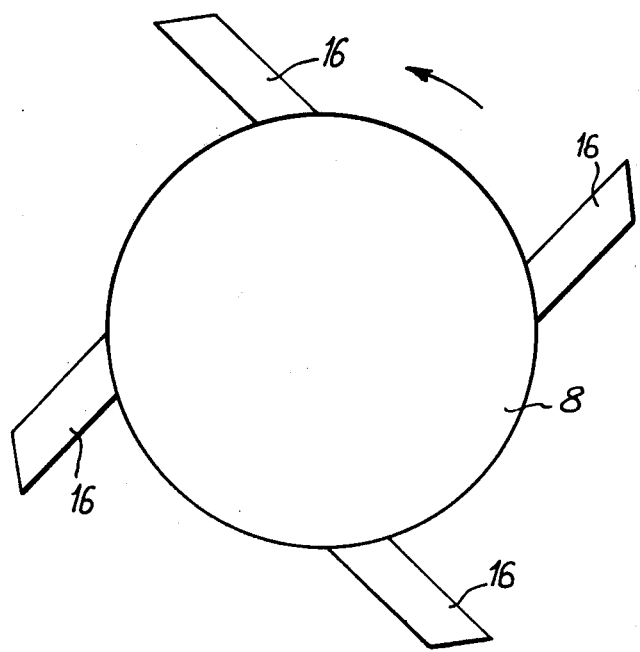

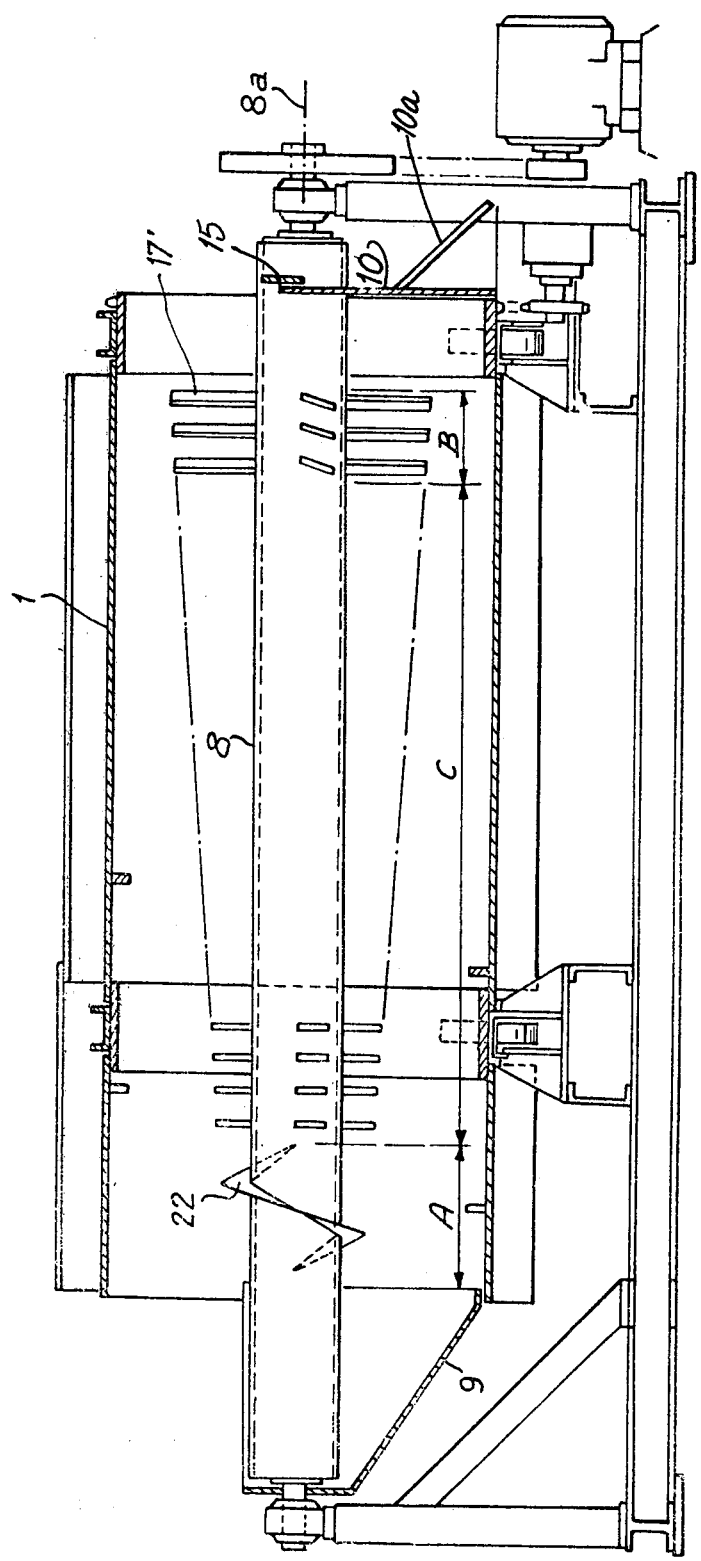

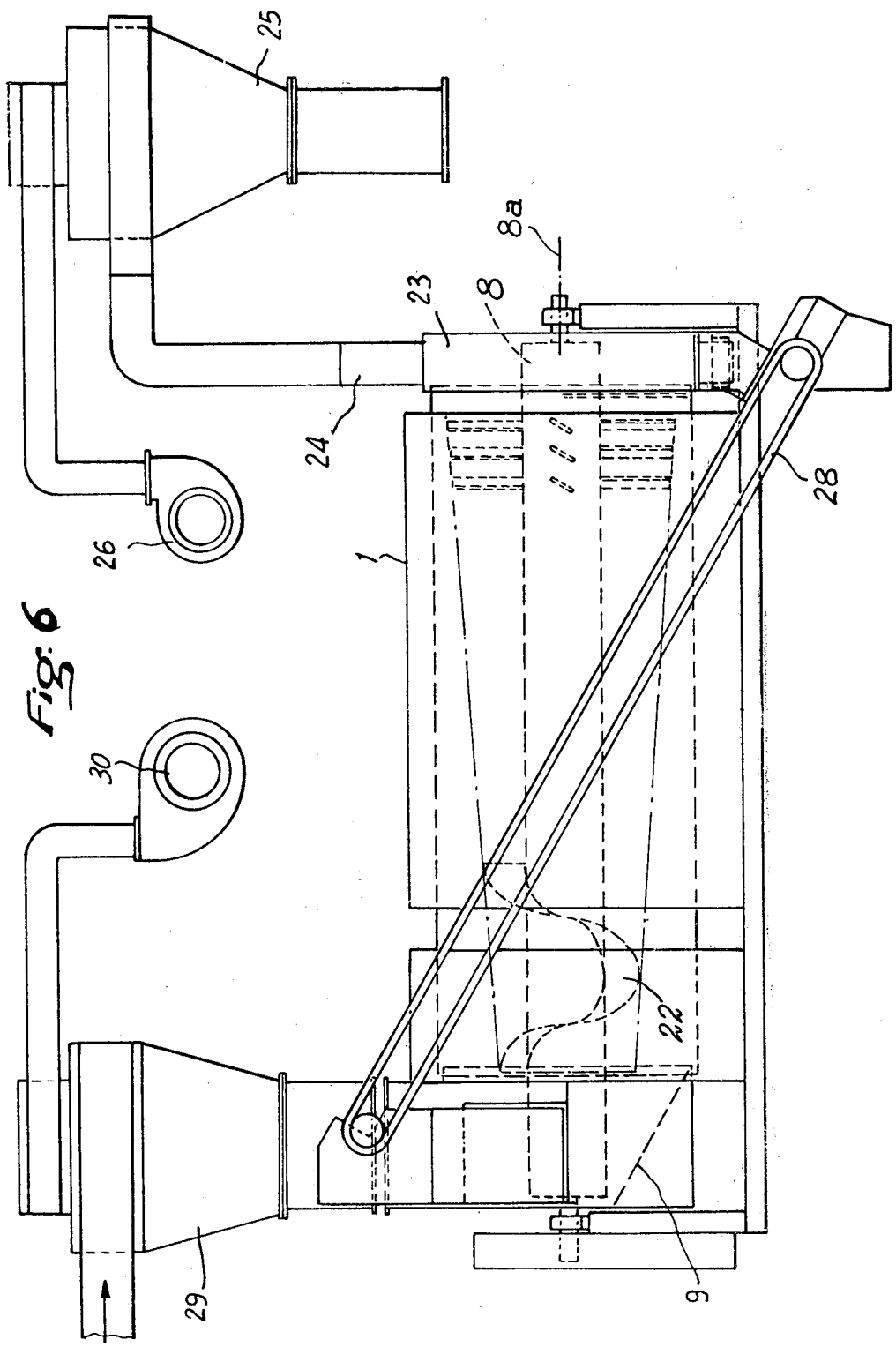

REDUCING DRUM FOR THE EXTRACTION OF CELLULOSIC MATTERS

FIELD OF THE INVENTION

The present invention relates to a device for extracting cellulosic or similar materials mixed with a large quantity of substances of different materials and called contaminants, such as rags, plastics, light metals, wood and others.

BACKGROUND AND SUMMARY OF THE INVENTION

The present invention relates to a device to be used after a rough sorting of household refuse. It applies to the processing of the lighter part of said household refuse.

An object of the present invention is to reduce the rate of contaminants contained in said lighter part of the household refuse so that this material may be accepted for the processing cycle of paper mills. Practically, the cleaning operation performed by the device reduces the contaminant rate from a value of the order of 35% to a value close to 12%.

A further object still of the invention is to provide a device allowing continuous discharge of the separated contaminants in order to avoid periodic stops of the device for cleansing and removal of the contaminants.

A further object of the invention is to achieve the cleansing operation in an apparatus of simple construction which is robust and reliable, and in which the shredding and lacerating operations of the product are effectively performed at room temperature without introduction of media other than the water necessary for wetting the material to be processed.

For achieving these objects, the extraction device according to the invention comprises the following means taken in combination:
- a drum of general cylindrical shape, with its axis horizontal, or substantially inclined in relation to the horizontal, driven in slow rotation in a certain direction,
- a rotor, placed inside the drum, with its axis parallel or coinciding with the axis of the drum, driven in fast rotation in a direction which is the reverse of said certain rotation direction and provided on its peripheral surface, on at least part of its length, with shredding teeth,
- a feed-hopper placed at one end of the drum,
- and a fixed plate forming a chute for the contaminants, placed at the other end of said drum.

Preferably, the rotor is of cylindrical shape, but it can also have a generally conical shape tapering towards the feed side of device.

The shredding teeth are each made of a portion of a V-shaped bar protruding at the periphery of the rotor, the point of the profile section being oriented in the direction of rotor rotational movement.

The teeth are inclined at an angle $\alpha$, close to 45 degrees, relative to the rotor radius passing through the base of a tooth.

Preferably, on a first portion of its length from the feed side, the rotor is provided at its periphery only with cutting fingers. Said cutting fingers are made each of a substantially rectangular plate iron, protruding at the rotor periphery in a plane which is perpendicular to the rotor axis, the front or leading edge of the plate being a cutting edge.

According to another embodiment, there is provided on said first portion of the rotor, instead of the shredding fingers, a projection formed as a helix with one or two turns for facilitating the introduction of the material to process.

According still to said other embodiment, the last shredding teeth placed in the region of the drum outlet are inclined relative to the rotation axis so as to act as a ventilator by forcing the air towards the rear outlet.

According to a further embodiment, a hood may be provided at the drum rear outlet and an air exhaust located at the upper part of said hood through which is introduced an exhaust stream.

Under these conditions, any light plastics in sheet form which remain at the rear of the drum are sucked upwards and recovered in the exhaust stream whereas the heavy refuse falls downwards. This arrangement allows the recovery of light plastics from the total refuse, which represents an advantage since the latter have a commercial value.

Advantageously, the drum of the device is formed with two areas of perforations extending along its length. A first area is situated on the feed-hopper side, where the perforations are small in order to previously eliminate fine contaminants such as dust. A second perforation area, follows the first one, where the perforations are larger for allowing passage of the shredded cellulosic matters while retaining the other contaminants.

It is also possible to provide a brush for cleaning the drum and a water-distributor outside and on the surface of the latter for completing the cleansing operation and wetting the material to be processed.

Preferably, sections of a helicoidal ramp are provided on the inner surface of the drum, in the vicinity of the feed side, for pushing the material to be processed towards the barrier which forms the outlet chute.

Finally, and also preferaly, there is provided a recycling conveyor-belt at the outlet of the drum, oriented towards the inlet of said drum for receiving the heavy refuse, that is unwanted materials such as heavy plastics, wood refuse, light metals, etc., as well as the insufficiently reduced matters such as very resistant wetted cardboards. Said conveyor provides a sorting between both categories of heavy refuse. Those belonging to the first category and which are only lightly adhering fall at the rear of the conveyor whereas those belonging to the second category, and which are wetted, adhere to the conveyor and are re-introduced in the reducing drum for a further processing cycle.

The invention will become more apparent from the following description of one embodiment thereof when taken in conjunction with the accompanying drawings wherein:

BRIEF DESCRIPTION OF THE DRAWINGS

FIG. 4 is an end view of the rotor in the area provided with cutting fingers.

FIG. 5 shows the rotor of the invention acording to another embodiment, with a feed helix in its first portion and shredding teeth in the vicinity of the outlet.

FIG. 6 shows the entire assembly with the recycling conveyor belt and the exhaust hood for the products.

DETAILED DESCRIPTION

Figure 2:
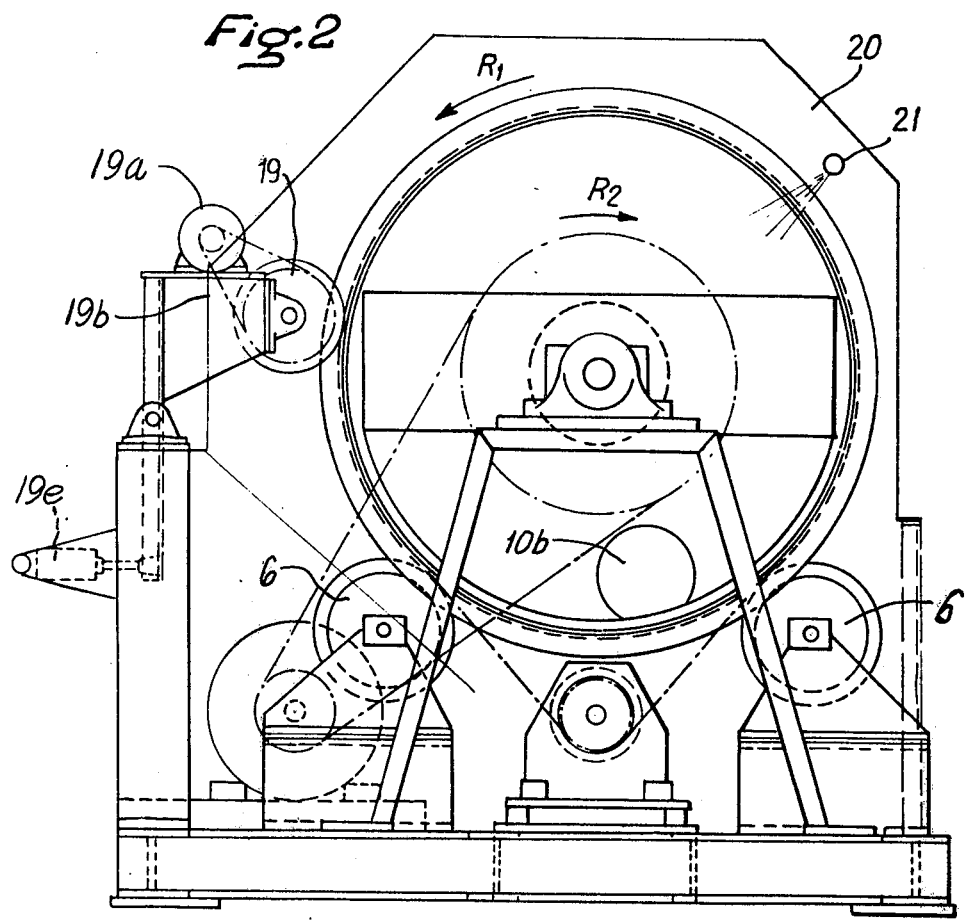
FIG. 2 is an end view of the device of FIG. 1.

The device includes a drum 1 of generally cylindrical shape with horizontal axis, driven in slow rotation about its axis in the rotation direction shown by arrow $R_1$ of FIG. 2. The drive may be provided by any appropriate means, illustratively by a system of sprocket wheels 2 and 3 and a chain 4, the driving sprocket 3 shown mounted integral with the output shaft of a motor 5.

The drum is supported, for example, by rollers 6 and 7.

The drum wall is made of perforated metal plates as will be described hereinafter.

A rotor 8, placed inside the drum, its axis coinciding with the drum axis, is driven in fast rotation in a direction which is the opposite of the rotation direction of the drum, as shown by arrow $R_2$ of the FIG. 2. Said rotor is driven in rotation by means of motor 11, belt 12 mounted on the driving pulley element 13 and a pulley wheel 14.

Figure 1:
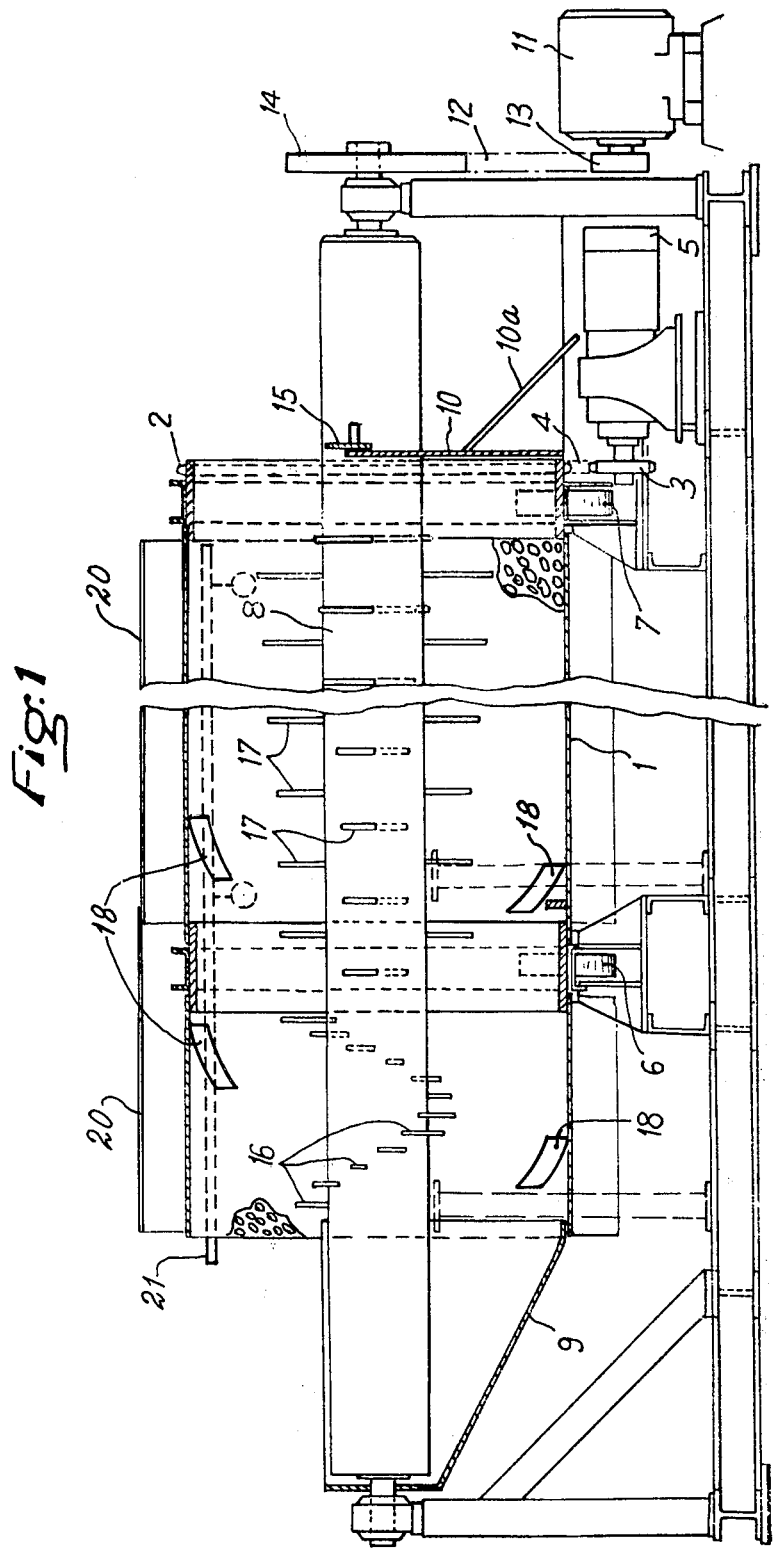
FIG. 1 is an elevation view, partly in cross section, of the device according to the invention.

On the left hand side of FIG. 1 is shown a feed device 9, called a feed-hopper, which is formed of a semi-conical metal plate adjoining the end of drum 1.

Preferably, as is shown in FIG. 6, the admission of the products is aided through an air circulation system of known type, referenced as numeral 29 (see FIG. 6), operated by a ventilator or blower, 30.

At the other end of the drum is placed a plate 10 which is held fixed by an outer frame member 10a and extends in the final portion of the drum up to a height which is close to and preferably higher than the height of the drum axis. Said plate 10 forms a fixed barrier, or chute, for the refuse of contaminants, as will be described hereafter in the description of the operation of the apparatus.

To said plate 10 is attached another plate 15 the position of which is adjustable in height for example, by any suitable arrangement such as screws passing through slots in plate 15 and threaded into plate 10. The assembly of plates 10 and 15 provides therefore an adjustable chute. At the base of plate 10 is provided an opening 10b of appropriate shape and dimension for the evacuation from the drum of textile elements, such as rags, which wrap and form clusters due to the rotation of the drum and rotor and travel longitudinally under the mechanical action of the other elements.

On a first portion of its length from the feed side, rotor 8 is provided on its periphery with cutting fingers 16, (see FIG. 1 in particular) placed substantially along a helical path. Each cutting finger is made of a substantially rectangular metal plate extending perpendicularly to the rotor axis. The leading edge of each cutting finger 16 is a cutting edge. In FIG. 4 is shown a lateral cross-sectional view of the rotor in the area close to the feed inlet with four cutting fingers 16. Preferably, said fingers are inclined at an angle equal or close to 45 degrees relative to the rotor radius passing through the finger base. The fingers 16 are arranged in a helical path.

According to another embodiment of the rotor, schematically shown in FIG. 5, a projection in the form of a helix or helicoid 22 may be used instead of cutting fingers 16. The helix has one or two turns for facilitating the introduction of the materials to be processed. That is, the helix imparts a force to project the material toward the outlet end of the drum.

On the remaining portion of the rotor length (FIG. 1), said rotor is provided with shredding teeth, referenced 17, more or less regularly spaced apart angularly as well as axially. Each shredding tooth 17 is made of a portion of a V-shaped bar or dihedron (see FIG. 3), extending perpendicularly to the rotor axis, from the periphery of the latter towards the outside. The edge of each dihedron forms a leading edge and is oriented in the direction of the rotor rotation movement, as shown in FIG. 3.

Figure 3:
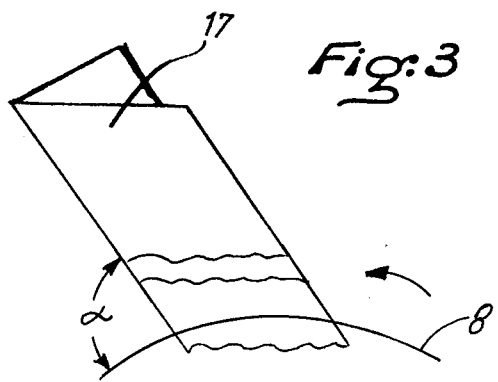
FIG. 3 is a perspective view of an embodiment of a shredding tooth of the rotor.

As may be seen in FIG. 3, the shredding teeth 17 are inclined at an angle $\alpha$ preferably of the order of 45° relative to the rotor radius passing through the base of the tooth.

The last shredding teeth 17, situated on the side of the drum outlet, may be inclined relative to the rotor rotation axis 8, in such manner as to act as a ventilator by forcing towards the rear outlet. This arrangement is shown by teeth 17' of the rotor in FIG. 5.

It is possible to use a rotor of non-circular, e.g. polygonal, cross-section. This arrangement facilitates the attachment of the teeth on the rotor since it is easier to weld on a flat surface than a circular surface.

The length of the teeth 17 increases along the longitudinal axis of the rotor in the direction towards the outlet chute.

The ratio between the distance from the extreme point of the teeth to the rotor axis and the drum radius is between about 0.70 and 0.90 in the end portion provided with teeth 17 which is closer to the outlet chute.

The drum is divided in two areas corresponding to the division of the rotor length between the portion of the rotor which is provided with cutting fingers 16 (or with a helix 22) and the rotor portion which is provided with shredding teeth 17. These two areas differ by the dimension of the perforations of the drum 1:

small perforations in the area close to the feed side, (see area referenced A in FIG. 5) of the order of 10–15 mm in diameter, and larger perforations in the complementary area, (see area B and C in FIG. 5) of the order of 30 mm in diameter.

Such dimensions relate to a drum of a length of about 4 meters and a diameter close to 1.5 meters.

The inner surface of the drum is provided, in the portion close to the feed side, with element 18 of helicoidal shape protruding from said surface. In the example being described, there are four of such elements.

A rotary brush 19 (see FIG. 2) driven by a motor 19a is provided outside the drum along the areas B and C hovering the larger perforations. Said brush may be applied continuously on the outside surface of the drum, or periodically by any appropriate means providing a retraction action, such as the oscillating support 19b which is operated by the hydraulic piston 19c. The brush 19 enables easy extraction of particles of cellulosic matters.

A hood 20 surrounding the device assembly and extending from the base, forms a collector for the discharged material. Mounted on said hood, outside and along the drum, is provided a water-distributor 21 (FIG. 2) comprising projecting water-jets on the outside surface of the drum.

Preferably, there is provided at the rear outlet of the drum, around the adjustable plate 15, a hood 23 (FIG. 6) and an air suction duct 24 at the upper part of said hood. Through the introduction of an exhaust air stream by an exhuast fan 26, the light plastics in sheet form are sucked upwards and recovered in the exhuast stream and held in a tank 25 whereas the heavy refuse falls downwards. This allows the recovery of said light plastics which have a commercial value.

In FIG. 6 there has also been represented a re-cycling conveyor 28, the action of which will be explained hereafter with the description of the operation of the device.

In the present example, the peripheral rotation speed of the drum is about one meter per meter/second and the peripheral rotation speed of the rotor is about 9 meters per second.

It has been proven experimentally that the optimal results are obtained with a rotor peripheral speed between about 0.8 and 1.4 meters/second and a ratio between the drum rotation speed and the rotor peripheral rotation speed about 0.05 and 0.1.

The operation of the device is described as follows. Drum 1 rotates slowly and rotor 8 rotates more rapidly in the opposite direction. The mixture to be processed is loaded through hopper 9. Said mixture, owing to the helicoidal element 18, travels along drum 1 and the cutting fingers 16 divide or finely cut the less resistant materials whereas those which are more resistant are not divided or only slightly divided.

The fine materials so divided pass out through the drum perforations and are collected at the base of hood 20. The non-divided materials accumulate at the drum outlet comprising the fixed plate 10 and adjustable plate 15 and, when this acccumulation is sufficient, overflow above the plate 15. As previously described, items such as heavy plastics and clusters of textiles exit through the opening 10b in plate 10. Light plastics overflow plate 15 and cut paper exits through the larger perforations in the drum with the dust and other small particles exiting through the smaller drum perforations. This action is generally the same for the embodiments of FIGS. 1 and 6 with the exception, to be described below, that in FIG. 6 light plastics are removed by an air flow and heavy cardboards are recycled.

In the alternative embodiment shown in FIG. 6, a hood 23 is provided at the drum outlet, on the level of the adjustable chute as previously described. The outlet air flow from the outlet air system 25, 26 causes the recovery of some of the light elements such as the light plastics in sheet form which are sucked upwards and recovered in the tank 25, set in motion by the fan 26 whereas the remainder of the non-divided material falls downwards.

The required operation is thereby performed, that is, the separation of the mechanically less resistant materials from those which are more resistant.

In the case where the problem is to separate the non-resistant materials, such as cardboard in a wet state from the resistant materials, such as plastics in the same state, the processing is the same as previously explained but, in addition, the water distributor 21 situated outside of the drum is operated in order to wet the mixture. Plastic materials do not absorb water but pourous materials such as cardboards do. At the output end of the drum the light plastics are removed by the air stream, but the heavy plastics and cardboard are not. Pieces of cardboard which are not sufficiently wet are not torn. The plastics are not actually wet since they are not permeable to water. A fully wet cardboard can be more easily torn by the fingers 16, 17. The plastic materials slide or roll off the belt.

In order to recover said cardboards, the heavy refuse are recovered on the belt of a recycling conveyor 28 the speed of which being such that only the wet cardboards are carried by the belt. The other remaining materials which have a lower adherence fall back at the rear of the conveyor. The cardboards are re-introduced in the feed device 1.

The rotary brush 19 placed outside of the drum is used for cleaning said drum and avoiding a progressive obstrution of its perforations. If the dirt accumulating in the drum builds up only slowly, it is possible to operate the cleaning brush only periodically. In this case, the latter may be lifted via an appropriate mechanism 19b, 19c in order not to be in contact with the drum.

It may be that the mixture of materials to be processed comprises a proportion of fine particles, such as dusts, which it is desired to previously eliminate. In such a case, in the first area provided with fine perforations (area A in FIG. 5), the process will be carried out under dry conditions. Under the action of the rotor, the mixture is violently shaken, causing the passage of the fine particles (dusts) through the small drum perforations. Thereafter, the mixture which has been deprived of the dust travels as previously described along the drum, reaches the area formed with the larger perforations where the separating between the mechanically resistant materials and the mechanically less resistant materials is performed as hereabove described.

The fine particles (dusts) eliminated in the first area of the drum formed with fine perforations are of course discharged separately by any appropriate means as for instance partitioning of hood 20.

With the hereabove described device of the invention, the shredding action is vigorous and is performed in an important volume and not only at the inner periphery of the drum. The cutting fingers 16 cut the large dimension paper sheets into smaller pieces and form a solid mass. In some cases materials such as plastics are also cut. The shredding teeth 17 follow with a crushing action without cutting and they form a furrow-like depression in the solid mass further shredding materials such as paper to a bulk of fibers which exit the drum through the perforations. The teeth 17 do not further cut materials such as plastics. The material rubs conveniently on itself to cause further separation. The fixed and movable plates 10, 15 contributes also, through a squeezing action, to the proper friction of the material upon itself.

According to the mixture of materials being processed it will be possible to adjust various elements without departing from the scope of the invention. For example, the height of the barrier which forms the chute at the rear of the drum can be adjusted and a selection made for the dimensions and number of perforations of the drum peripheral surface. Also the number, shape and diameter of the rotor teeth can be selected as can the rotation speeds of the rotor and drum.

Experimentally also, the drum peripheral speed is between about 0.8 and 1.4 meters/second and the ratio of the drum and rotor peripheral speeds is between about 0.05 and 0.1.

What we claim is:

1. A device for extracting cellulosic and similar materials which are mixed with other materials comprising:
    a hollow drum, said drum being formed with perforations along at least a part of its length,
    means for rotating said drum in a first direction at a first speed,
    a feed hopper at the inlet end of the drum into which all of said materials are loaded,
    a rotor within said drum, means for rotating said rotor in a direction opposite to said first direction and at a speed higher than said first speed, a plurality of shredding teeth on the periphery of the rotor along at least a portion of the length of the rotor for engaging the materials within the drum, and for shredding the cellulosic materials into pieces, said pieces leaving the drum through said perforations, and a barrier wall at the end of the drum opposite the inlet end against which the other materials accumulate and overflow out of the drum.

2. A device according to claim 1 wherein the rotor is of generally cylindrical shape with its axis coaxial with the drum axis.

3. A device according to claim 2 wherein the length of the shredding teeth increases in the direction of the chute along the length of the rotor.

4. A device according to claim 1 wherein the distance from the outside end of the teeth to the rotor axis increases from the feed hopper to the barrier.

5. A device according to claim 1 wherein the shredding teeth are in the shape of a portion of a V-shaped bar protruding on the rotor periphery, the point of the profile section being oriented in the direction of rotor rotation.

6. A device according to claim 5 wherein the teeth are inclined at an angle of about 45° relative to a radius of the rotor passing through the base of the tooth.

7. A device according to claim 1 wherein along a portion of the rotor length situated near the chute, the shredding teeth are inclined relative to the rotor rotation axis, to force air towards the outlet.

8. A device according to claim 1 wherein on a first portion of the rotor length adjacent the feed side, the rotor is provided with cutting fingers on its periphery, along a line which is substantially helicoidal.

9. A device according to claim 8, wherein the cutting fingers are each formed of a substantially rectangular metal plate, protruding at the periphery of the rotor in a plane which is peripendicular to the rotor axis, the leading edge of the plate being a cuttting edge.

10. A device according to claim 1 wherein on a first portion of the rotor length from the feed side, the rotor is provided on its periphery with a helical projection of at least one turn.

11. A device according to claim 1 wherein helicoidal ramp elements are provided on the rotor in the vicinity of the feed-hopper which act as pushing elements for the material being processed.

12. A device according to claim 1 wherein the drum is formed along its length with two perforation areas, a first area, situated on the side of the feed hopper having small perforations through which fine contaminants are removed and a second perforation area following the first one where the perforations are larger for allowing the removal of larger pieces of material.

13. A device according to claim 1 further comprising a hood at the drum outlet and exhausting means at the upper part of said hood, for exhausting certain non-divided light elements as they come out of the drum.

14. A device according to claim 1 further comprising means for wetting the materials at the drum outlet, a re-cycling conveyor for the heavy refuse at the drum outlet, the conveyor including a belt which is travelling at a speed such that wet mterials which adhere to the belt are driven and re-introduced at the input of the drum, the materials which are less adherent falling back at the rear of the conveyor.

15. A device according to claim 1, further comprising outside of the drum a rotary brush for cleaning the drum to facilitate the extraction of particles of cellulosic material base.

16. A device according to claim 1 further comprising outside and along the drum water distributor means for cleaning the drum perforations and providing humidification for the materials being processed.

17. A device according to claim 1, wherein the ratio between the distance of the extreme point of the teeth to the rotor axis and the drum radius is between about 0.70 and 0.90 in the area provided with teeth which is nearest to the chute.

18. A device according to claim 1, wherein the drum peripheral speed is between about 0.8 and 1.4 meters per second.

19. A device according to claim 1, wherein the ratio between the peripheral rotation speeds of the drum and the rotor is between about 0.05 and 0.1.

* * * * *

UNITED STATES PATENT AND TRADEMARK OFFICE
CERTIFICATE OF CORRECTION

PATENT NO. : 4,154,407
DATED : May 15, 1979
INVENTOR(S) : Pierre Lamort

It is certified that error appears in the above—identified patent and that said Letters Patent is hereby corrected as shown below:

On the title page insert --[30] Foreign Application Priority Data

| | | |
|---|---|---|
| June 29, 1977 | France | 77 19908 |
| June 29, 1977 | France | 77 19909 |

Signed and Sealed this

Nineteenth Day of August 1980

[SEAL]

Attest:

SIDNEY A. DIAMOND

Attesting Officer

Commissioner of Patents and Trademarks